(12) United States Patent
Seok et al.

(10) Patent No.: US 10,167,750 B2
(45) Date of Patent: Jan. 1, 2019

(54) VARIABLE VALVE DURATION APPARATUS

(71) Applicant: Hyundai Motor Company, Seoul (KR)

(72) Inventors: Donghoon Seok, Yongin-si (KR); Jaechun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 76 days.

(21) Appl. No.: 15/372,672

(22) Filed: Dec. 8, 2016

(65) Prior Publication Data

US 2018/0051602 A1 Feb. 22, 2018

(30) Foreign Application Priority Data

Aug. 17, 2016 (KR) .................... 10-2016-0104383

(51) Int. Cl.
| | |
|---|---|
| *F01L 1/34* | (2006.01) |
| *F01L 13/00* | (2006.01) |
| *F02D 13/02* | (2006.01) |
| *F01L 1/18* | (2006.01) |
| *F01L 1/24* | (2006.01) |
| *F01L 1/46* | (2006.01) |

(52) U.S. Cl.
CPC .......... *F01L 13/0047* (2013.01); *F01L 1/185* (2013.01); *F01L 13/0036* (2013.01); *F02D 13/0207* (2013.01); *F02D 13/0226* (2013.01); *F01L 1/2405* (2013.01); *F01L 2001/186* (2013.01); *F01L 2001/467* (2013.01); *F01L 2105/00* (2013.01)

(58) Field of Classification Search
CPC ... F01L 13/0047; F01L 13/0036; F01L 1/185; F01L 1/2405; F01L 2001/186; F01L 2001/467; F01L 2105/00; F02D 13/0207
See application file for complete search history.

(56) References Cited

U.S. PATENT DOCUMENTS

| | | | |
|---|---|---|---|
| 7,546,822 B2 | 6/2009 | Murphy et al. | |
| 7,845,319 B2 * | 12/2010 | Rayl | ........................ F01L 1/185 |
| | | | 123/321 |

FOREIGN PATENT DOCUMENTS

| | | |
|---|---|---|
| JP | 11-082075 A | 3/1999 |
| JP | 2006-299916 A | 11/2006 |
| KR | 10-2007-0050368 A | 5/2007 |
| KR | 10-2008-0019433 A | 3/2008 |
| KR | 10-1063489 B1 | 9/2011 |
| KR | 10-1209737 B1 | 12/2012 |
| KR | 10-1588763 B1 | 1/2016 |

\* cited by examiner

*Primary Examiner* — Zelalem Eshete
(74) *Attorney, Agent, or Firm* — Morgan, Lewis & Bockius LLP

(57) ABSTRACT

A variable valve duration apparatus may include a first cam rotating with a camshaft; a second cam rotating with the camshaft; a first operation device that is operated by the first cam to generate a valve lift; a second operation device that is operated by the second cam to generate the valve lift; and a controller controlling the first operation device or the second operation device to generate the valve lift according to an operation state of an engine.

8 Claims, 8 Drawing Sheets

VARIABLE VALVE DURATION APPARATUS

CROSS-REFERENCE TO RELATED APPLICATION

The present application claims priority to Korean Patent Application No. 10-2016-0104383 filed on Aug. 17, 2016, the entire contents of which is incorporated herein for all purposes by this reference.

BACKGROUND OF THE INVENTION

Field of the Invention

The present invention relates to a variable valve duration apparatus. More particularly, the present invention relates to a variable valve duration apparatus that can change opening duration of a valve with a simple configuration in accordance with the operational states of an engine, and an engine including the apparatus.

Description of Related Art

In general, internal combustion engines generate power by receiving and burning air and fuel in a combustion chamber. When air is sucked, an intake valve is operated by a camshaft and air is sucked into the combustion chamber while the intake valve is open. Further, an exhaust valve is operated by the camshaft, and air is discharged from the combustion chamber while the exhaust valve is open.

However, optimal operations of the intake valve and the exhaust valve are varied in accordance with a rotation speed of an engine. A proper lift or proper valve opening and closing timing is varied in accordance with the rotation speed of the engine. In order to achieve such an optimal valve operation depending on the rotation speed of the engine, various researches, such as designing a plurality of cam and a variable valve lift (VVL) that can change valve lift according to engine speed, have been undertaken.

Also, in order to achieve such an optimal valve operation depending on the rotation speed of the engine, research has been undertaken on a variable valve timing (VVT) apparatus that enables different valve timing operations depending on the engine speed. The general VVT may change valve timing with a fixed valve opening duration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable valve duration apparatus having advantages of being able to adjust duration of a valve lift in accordance with operational states of an engine.

Various aspects of the present invention are directed to providing a variable valve duration apparatus, including: a first cam rotating with a camshaft; a second cam rotating with the camshaft; a first operation device that is operated by the first cam to generate a valve lift; a second operation device that is operated by the second cam to generate the valve lift; and a controller controlling the first operation device or the second operation device to generate the valve lift according to an operation state of an engine.

The controller may control the first operation device to generate the valve lift when a rotation speed of the engine is smaller than a first predetermined value or greater than a second predetermined value.

The controller may control the second operation device to generate the valve lift when a rotation speed of the engine is between a first predetermined value and a second predetermined value.

The variable valve duration apparatus may further includes a latching device variably operating a valve by fixing or releasing the first operation device and the second operation device.

The controller may control the latching device to fix the first operation device and the second operation device when a rotation speed of the engine is between a first predetermined value and a second predetermined value, and control the latching device to release the first operation device and the second operation device when the rotation speed of the engine is smaller than a first predetermined value or greater than a second predetermined value.

The controller may generate the valve lift by an operation of the second operation device when a rotation speed of the engine is between a first predetermined value and a second predetermined value, and increase duration of the valve lift according to the second operation device than the valve lift according to the first operation device.

The second operation device may include an internal roller disposed in an internal pad and rotating by the second cam.

The first operation device may include an outer pad disposed outside of the internal pad and the internal roller and operating a valve by the first cam.

The first operation device may include outer rollers disposed to both end portions of the internal roller and the internal pad and operating a valve by the first cam.

According to an exemplary embodiment of the present invention for achieving the object, by adjusting the opening duration of an intake valve according to a rotation speed of the variable valve duration engine, it is possible to improve the starting performance and the fuel consumption.

In addition, when the engine speed is smaller than the first predetermined value or greater than the second predetermined value, since the first operation device is operated by the first cam, therefore the starting performance of the engine can be improved and driving performance can be improved during the acceleration.

In addition, when the engine speed is between the first predetermined value and the second predetermined value, since the second operation device is operated by the second cam, therefore the fuel consumption can be improved by Late Intake Valve Closing (LIVC) effect.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
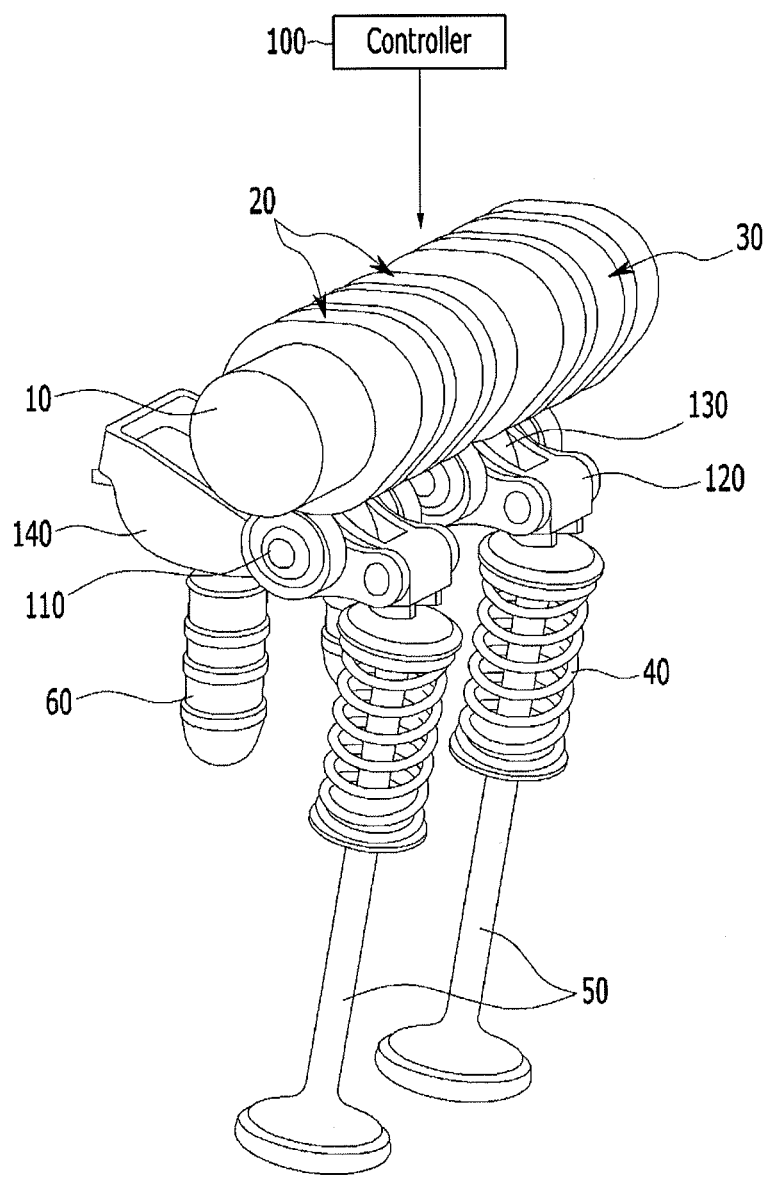
FIG. 1 is a perspective view of a variable valve duration apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Throughout the specification, unless explicitly described to the contrary, the word "comprise" and variations such as "comprises" or "comprising" will be understood to imply the inclusion of stated elements but not the exclusion of any other elements.

Parts indicated by like reference numerals are the same components throughout the specification.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuel derived from resources other than petroleum).

In addition, some methods may be executed by at least one controller. The term "controller" refers to a hardware device including a memory and a processor configured to execute one or more steps interpreted as an algorithm structure. The memory stores algorithm steps, and the processor executes the algorithm steps to perform one or more processes to be described below.

Further, control logic of the present invention may be implemented by a non-transient computer-readable medium on a computer-readable device including executable program instructions executed by a processor, a controller, or the like. Examples of a computer-readable medium, although not restrictive, include ROMs, RAMs, CD-ROMs, magnetic tapes, floppy disks, flash drives, smart cards, and optical data storages. The computer-readable recording medium may be distributed in a network-connected computer system, and for example, may be stored and executed in a distributed manner by a telematics server or Controller Area Network (CAN).

A variable valve duration apparatus will now be described with reference to FIG. 1 to FIG. 8.

FIG. 1 is a perspective view of a variable valve duration apparatus according to an exemplary embodiment of the present invention.

Referring to FIG. 1, an engine includes a variable valve duration apparatus mounted on a cylinder head.

The variable valve duration apparatus according to an exemplary embodiment of the present invention includes a plurality of first cam 20 rotating with a camshaft 10, a second cam 30 rotating with the camshaft 10, a first operation device 110 that is operated by the first cam 20 to generate a valve lift, a second operation device 130 that is operated by the second cam 30 to generate the valve lift, a controller 100 controlling the first operation device 110 or the second operation device 130 to generate the valve lift according to an operation state of an engine, and a valve 50 opened or closed by the first operation device 110 or the second operation device 130.

The controller 100 monitors a rotation speed of the engine and controls the duration of the valve lift by fixing or releasing the first operation device 110 and the second operation device 130 according to an operation state of the engine.

When the rotation speed of the engine is smaller than a first predetermined value (e.g., 1500 rpm) or greater than a second predetermined value (e.g., 4500 rpm), the controller 100 releases the first operation device 110 and the second operation device 130 and controls the first operation device 110 to generate the valve lift of the valve 50.

In addition, when a rotation speed of the engine is between the first predetermined value and the second predetermined value, the first operation device 110 and the second operation device 130 are fixed, and the controller 100 controls the second operation device 130 to generate the valve lift.

For such an object, the controller 100 may be implemented with at least one processor operating by a predetermined program, and the predetermined program may be programmed to perform each step according to the valve duration control method according to an exemplary embodiment of the present invention.

Figure 2:
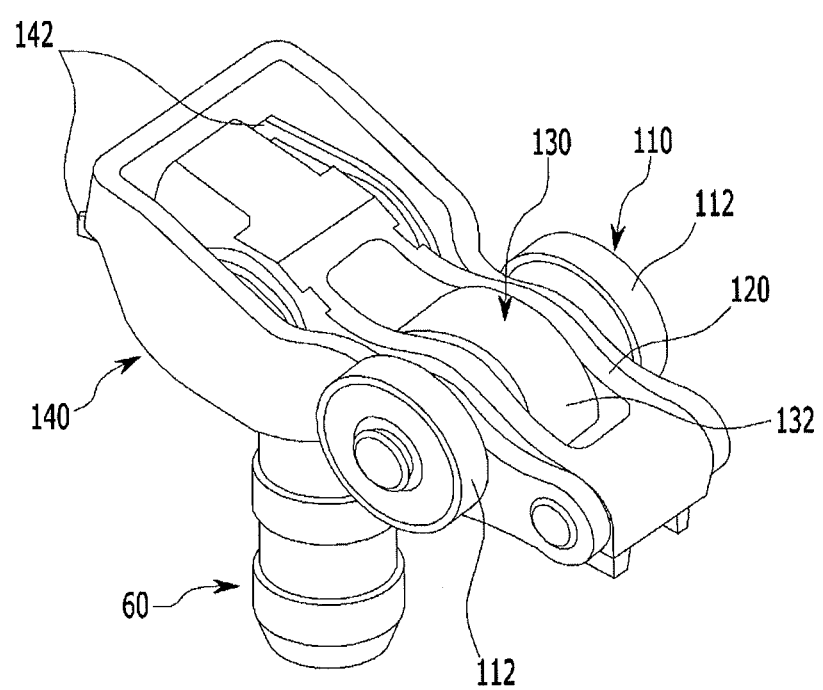
FIG. 2 is a drawing showing a portion of a variable valve duration apparatus of a roller type of FIG. 1.

FIG. 2 is a drawing showing a portion of a variable valve duration apparatus of a roller type of FIG. 1.

Referring to FIG. 2, the variable valve duration apparatus of a roller type according to an exemplary embodiment of the present invention includes a first operation device 110, an internal pad 120, a second operation device 130, an outer arm 140, a hydraulic pressure gap adjusting portion 60 (HLA, Hydraulic Lash Adjuster), and a torsion spring 142.

The second operation device 130 includes an internal roller 132 disposed between an internal pad 120 and rotating by the second cam 30. The first operation device 110 includes a plurality of outer rollers 112 disposed to both end portions of the internal roller 132 and internal pad 120 and operating the valve by the first cam 20.

A latching device is disposed in the outer arm 140, and variably operates the valve by fixing or releasing the outer roller 112 of the first operation device 110 and the internal roller 132 of the second operation device 130.

Figure 3:
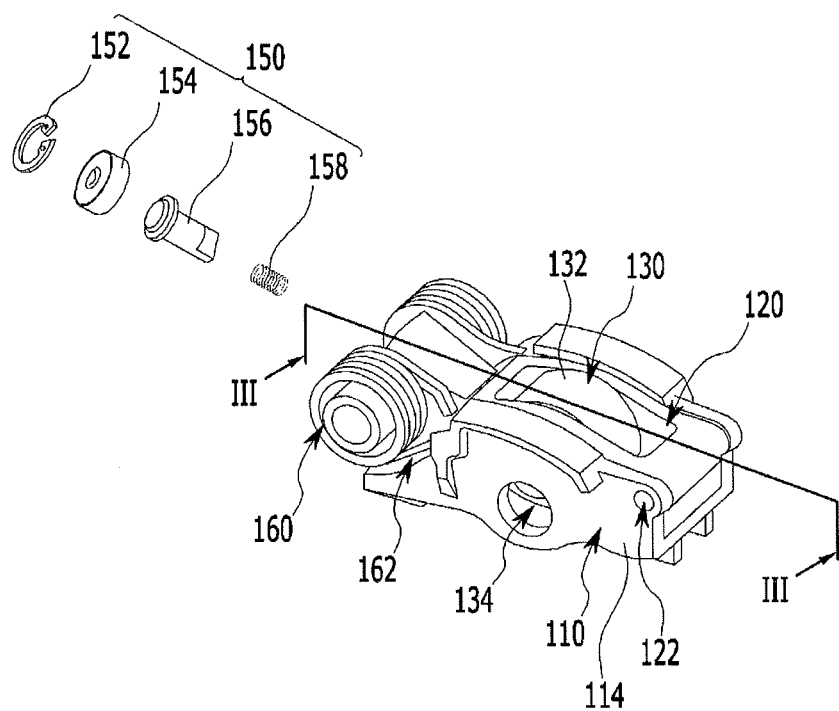
FIG. 3 is an exploded perspective view of a variable valve duration apparatus of a pad type according to another exemplary embodiment of the present invention.
Figure 4:
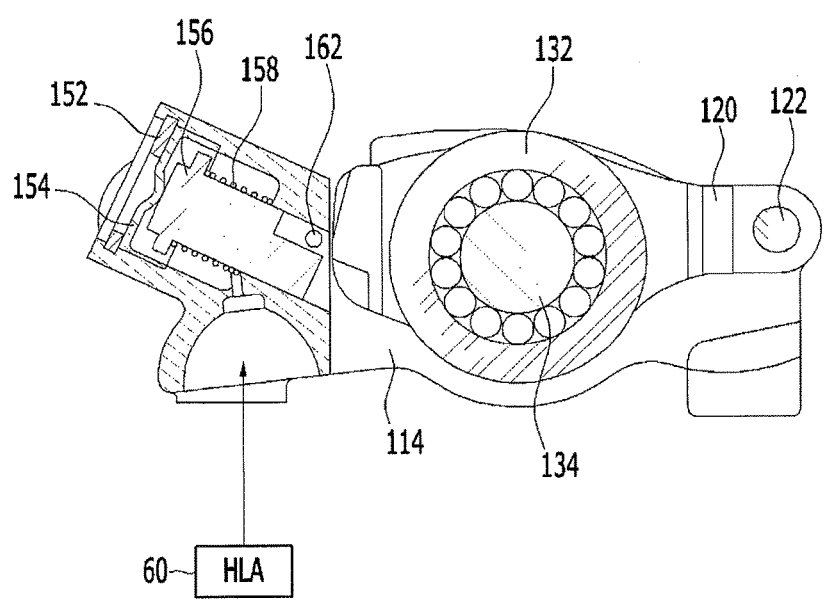
FIG. 4 is a cross-sectional view along a line III-III of FIG. 3.

FIG. 3 is an exploded perspective view of a variable valve duration apparatus of a pad type according to another exemplary embodiment of the present invention, and FIG. 4 is a cross-sectional view along a line of FIG. 3.

Referring to FIG. 3 and FIG. 4, the variable valve duration apparatus of a pad type according to another exemplary embodiment of the present invention includes a first operation device 110, an internal pad 120, a second operation device 130, a latching device 150, a lost motion spring 160 and a hydraulic pressure gap adjusting portion 60.

The second operation device 130 includes an internal roller 132 and an internal roller pin 134. The internal roller 132 is disposed between the internal pad 120 and is rotated by the second cam 30. The internal roller 132 is engaged to the internal pad 120 through the internal roller pin 134.

The first operation device 110 includes an outer pad 114 according to an exemplary embodiment of the present invention. The outer pad 114 is disposed outside of the internal pad 120 and the internal roller 132, and operates the valve 50 by the first cam 20. The outer pad 114 of the first operation device 110 is engaged with the internal pad 120 through a first pin 122. The lost motion spring 160 is engaged with the outer pad 114 of the first operation device 110 through a second pin 162.

The latching device 150 fixes or releases the outer pad 114 of the first operation device 110 and the internal roller 132 of the second operation device 130 to variably operate the valve by the first operation device 110 and the second operation device 130. The latching device 150 includes a clip 152, a spring supporting portion 154, a fixing pin 156, and a fixing spring 158.

Figure 5:
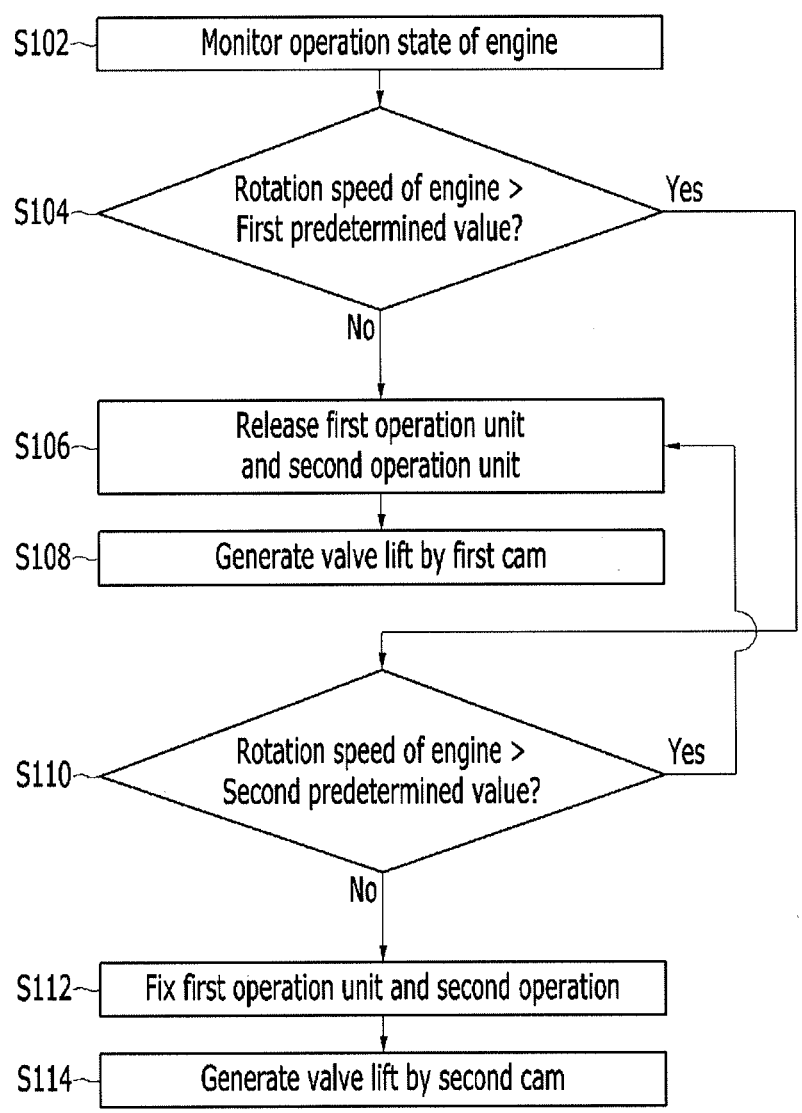
FIG. 5 is a flowchart briefly showing a process of controlling duration of a valve lift by a variable valve duration apparatus according to an exemplary embodiment of the present invention.

FIG. 5 is a flowchart briefly showing a process of controlling duration of a valve lift by a variable valve duration apparatus according to an exemplary embodiment of the present invention. The flowchart will be described with the same reference numerals as those of the configuration of FIG. 1 and FIG. 4.

Referring to FIG. 5, the variable valve duration apparatus according to an exemplary embodiment of the present invention monitors an operation state of the engine at step S102.

When the engine speed is smaller than a first predetermined value or greater than a second predetermined value, the variable valve duration apparatus according to an exemplary embodiment of the present invention releases the first operation device 110 and the second operation device 130 using the latching device 150 at steps S104 and S106.

Figure 6:
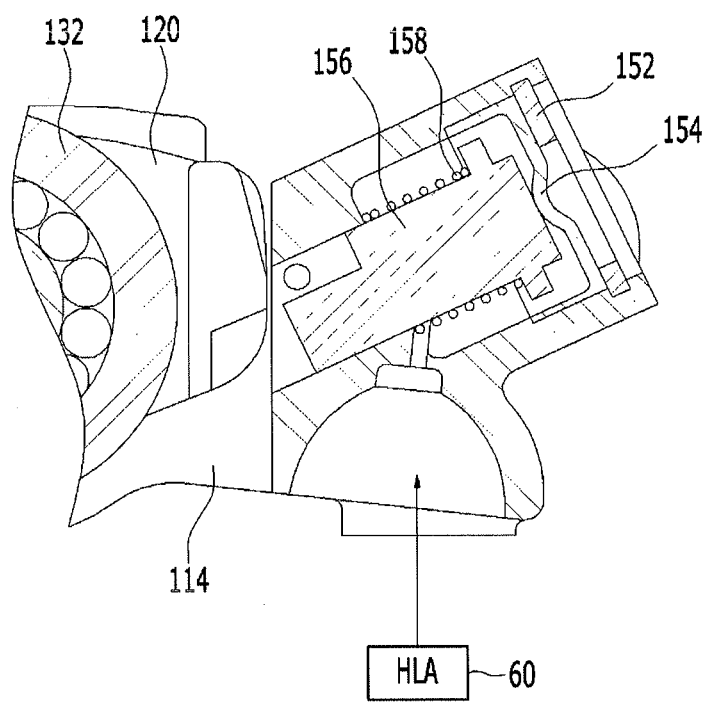
FIG. 6 is a cross-sectional view showing that a first operation device and a second operation device are released.

FIG. 6 is a cross-sectional view showing that a first operation device and a second operation device are released.

Referring to FIG. 6, in the case of the oil is not supplied through the hydraulic pressure gap adjusting portion 60, the controller 100 releases the first operation device 110 and the second operation device 130.

The variable valve duration apparatus according to an exemplary embodiment of the present invention generates the valve lift by the first cam 20 at step S108.

At this time, the second operation device 130 is rotated by the second cam 30, but the valve lift is not generated by the lost motion spring 160. In addition, the first operation device 110 is rotated by the first cam 20 and generates the valve lift.

When the engine speed is between the first predetermined value and the second predetermined value, the variable valve duration apparatus according to an exemplary embodiment of the present invention operates the latching device 150 to fix the first operation device 110 and the second operation device 130 at steps S110 and S112.

Figure 7:
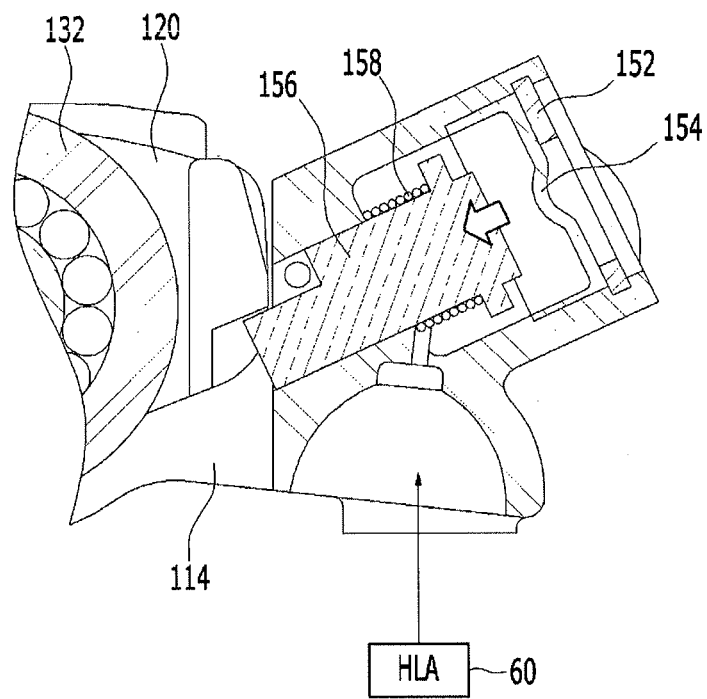
FIG. 7 is a cross-sectional view showing that a first operation device and a second operation device are fixed.

FIG. 7 is a cross-sectional view showing that a first operation device and a second operation device are fixed.

Referring to FIG. 7, in the case of the oil is supplied through hydraulic pressure gap adjusting portion 60, the fixing pin 156 of the latching device 150 is moved to fix the first operation device 110 and the second operation device 130. The outer pad 114 of the first operation device 110 and the internal roller 132 of the second operation device 130 may be fixed by the latching device 150.

The second operation device 130 is operated by the second cam 30 and generates the valve lift at step S114. When the valve lift is generated by the second operation device 130, the duration of the valve lift according to the second operation device 130 is increased than the valve lift according to the first operation device 110, and the time of the valve lift according to the second operation device 130 is delayed.

Figure 8:
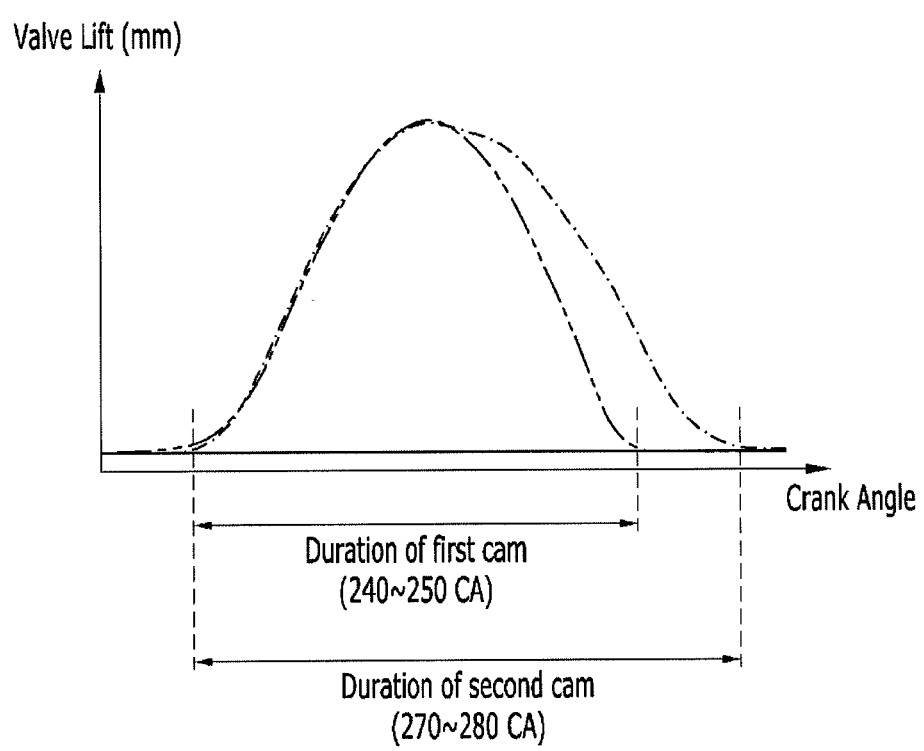
FIG. 8 is a graph showing a valve profile of a variable valve duration apparatus according to an exemplary embodiment of the present invention.

FIG. 8 is a graph showing a valve profile of a variable valve duration apparatus according to an exemplary embodiment of the present invention.

Referring to FIG. 8, the duration of the first cam 20 is between 240 to 250 CA, but the duration of the second cam 30 may be between 270 to 280 CA.

Accordingly, when the engine speed is smaller than the first predetermined value or greater than the second predetermined value, since the first operation device 110 is operated by the first cam 20 and the opening/closing timing of the valve is normally operated, therefore the starting performance of the engine is improved.

However, when the engine speed is between the first predetermined value and the second predetermined value, since the second operation device 130 is operated by the second cam 30 and the opening duration of the valve is increased, therefore the fuel consumption is improved by LIVC (Late Intake Valve Closing) effect.

As described, the variable valve duration apparatus according to an exemplary embodiment of the present invention adjusts the opening duration of an intake valve according to a rotation speed of the variable valve duration engine. Therefore, it is possible to improve the starting performance and the fuel consumption.

The foregoing exemplary embodiments of the present invention are not implemented only by an apparatus and a method, and therefore may be realized by programs realizing functions corresponding to the configuration of the exemplary embodiment of the present invention or recording media on which the programs are recorded. Such recording media may be executed in a user terminal as well as a server.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable valve duration apparatus, comprising:
a first cam rotating with a camshaft;
a second cam rotating with the camshaft;
a first operation device that is configured to be operated by the first cam to generate a valve lift;
a second operation device that is configured to be operated by the second cam to generate the valve lift; and
a controller controlling the first operation device or the second operation device to generate the valve lift according to an operation state of an engine,
wherein the controller is configured to control the second operation device to generate the valve lift when a rotation speed of the engine is between a first predetermined value and a second predetermined value.

2. The variable valve duration apparatus of claim 1, wherein
the controller is configured to control the first operation device to generate the valve lift when the rotation speed of the engine is smaller than the first predetermined value or greater than the second predetermined value.

3. The variable valve duration apparatus of claim 1, further including:
a latching device variably operating a valve by fixing or releasing the first operation device and the second operation device.

4. A variable valve duration apparatus, comprising:
a first cam rotating with a camshaft;
a second cam rotating with the camshaft;
a first operation device that is configured to be operated by the first cam to generate a valve lift;
a second operation device that is configured to be operated by the second cam to generate the valve lift;
a controller controlling the first operation device or the second operation device to generate the valve lift according to an operation state of an engine; and
a latching device variably operating a valve by fixing or releasing the first operation device and the second operation device,
wherein the controller is configured to control the latching device to fix the first operation device and the second operation device when a rotation speed of the engine is between a first predetermined value and a second predetermined value, and controls the latching device to release the first operation device and the second operation device when the rotation speed of the engine is smaller than the first predetermined value or greater than the second predetermined value.

5. A variable valve duration apparatus, comprising:
a first cam rotating with a camshaft;
a second cam rotating with the camshaft;
a first operation device that is configured to be operated by the first cam to generate a valve lift;
a second operation device that is configured to be operated by the second cam to generate the valve lift;
a controller controlling the first operation device or the second operation device to generate the valve lift according to an operation state of an engine; and
a latching device variably operating a valve by fixing or releasing the first operation device and the second operation device,
wherein the controller generates the valve lift by an operation of the second operation device when a rotation speed of the engine is between a first predetermined value and a second predetermined value, and increases duration of the valve lift according to the second operation device than the valve lift according to the first operation device.

6. A variable valve duration apparatus, comprising:
a first cam rotating with a camshaft;
a second cam rotating with the camshaft;
a first operation device that is configured to be operated by the first cam to generate a valve lift;
a second operation device that is configured to be operated by the second cam to generate the valve lift;
a controller controlling the first operation device or the second operation device to generate the valve lift according to an operation state of an engine; and
a latching device variably operating a valve by fixing or releasing the first operation device and the second operation device,
wherein the second operation device includes an internal roller disposed in an internal pad and rotating by the second cam.

7. The variable valve duration apparatus of claim 6, wherein
the first operation device includes an outer pad disposed outside of the internal pad and the internal roller and operating the valve by the first cam.

8. The variable valve duration apparatus of claim 6, wherein
the first operation device includes outer rollers disposed to first and second end portions of the internal roller and the internal pad and operating the valve by the first cam.

* * * * *